(12) United States Patent  
Sakurai et al.

(10) Patent No.: US 8,986,018 B2
(45) Date of Patent: Mar. 24, 2015

(54) ROTARY CONNECTOR DEVICE (71) Applicant: Niles Co., Ltd., Tokyo (JP)

(72) Inventors: Junichi Sakurai, Tokyo (JP); Yasumasa Serizawa, Tokyo (JP)

(73) Assignee: Valeo Japan Co., Ltd., Tokyo (JP)

( * ) Notice: Subject to any disclaimer, the term of this patent is extended or adjusted under 35 U.S.C. 154(b) by 153 days.

(21) Appl. No.: 13/752,676

(22) Filed: Jan. 29, 2013

(65) Prior Publication Data

US 2013/0196518 A1 Aug. 1, 2013

(30) Foreign Application Priority Data

Jan. 30, 2012 (JP) ................................. 2012-017233

(51) Int. Cl.
*H01R 39/00* (2006.01)
*H01R 35/04* (2006.01)
*B60R 16/027* (2006.01)
*H01R 35/02* (2006.01)

(52) U.S. Cl.
CPC .............. *H01R 35/04* (2013.01); *B60R 16/027* (2013.01); *H01R 35/025* (2013.01)
USPC ............................................ 439/15; 439/164

(58) Field of Classification Search
CPC . B60R 16/027; H01R 35/025; H01R 2201/26
USPC .............................................. 439/15, 34, 164
See application file for complete search history.

(56) References Cited

U.S. PATENT DOCUMENTS

| 5,593,310 | A | * | 1/1997 | Kawamoto et al. | 439/164 |
| 5,772,146 | A | * | 6/1998 | Kawamoto et al. | 242/388 |
| 6,364,676 | B2 | * | 4/2002 | Bunselmeier et al. | 439/164 |
| 8,740,626 | B2 | * | 6/2014 | Sakurai et al. | 439/15 |
| 2009/0317984 | A1 | | 12/2009 | Oishi et al. | |
| 2013/0014975 | A1 | * | 1/2013 | Sakurai et al. | 174/135 |

FOREIGN PATENT DOCUMENTS

EP  2 546 937 A1  1/2013
JP  2010-003514  1/2010

OTHER PUBLICATIONS

European Search Report issued Apr. 29, 2013 for corresponding European Application No. 13 00 0262.

* cited by examiner

*Primary Examiner* — Hae Moon Hyeon
(74) *Attorney, Agent, or Firm* — Rader, Fishman & Grauer PLLC (57) ABSTRACT

There is provided a rotary connector device in which a flat cable is wound and accommodated in an annular space between a rotating rotor and a fixed stator. The rotor is provided with a rotor main body made of a PBT resin, and a rotor cover portion made of a polyacetal resin and overlapping the rotor main body to ensure strength of the rotary connector device and reduce sliding noises between the flat cable and the rotor. The rotor cover portion is provided with an opening portion for pulling the flat cable in the annular space out of the rotor main body, and a concave portion is formed in a disc portion of the rotor cover portion for improving work efficiency at the time of assembling the rotor main body and the rotor cover portion.

6 Claims, 8 Drawing Sheets

ROTARY CONNECTOR DEVICE

CROSS-REFERENCE TO RELATED APPLICATION

This application claims priority under 35 USC 119 from Japanese Patent Application No. 17233/2012 filed on Jan. 30, 2012, the disclosure of which is incorporated by reference herein.

BACKGROUND OF THE INVENTION

1. Field of the Invention

The present invention relates to a rotary connector device which is used in relatively rotating components to perform an electrical connection for control of an air bag device incorporated in a steering device for an automobile or control of an audio device or a constant speed traveling device by a switch button provided on a steering wheel for an automobile.

2. Description of the Related Art

As an example of this kind of rotary connector device, there is provided a device where a space is formed between a rotor coupled to a rotating steering shaft and a stator coupled to a vehicle fixed side, and a flat cable a winding direction of which is reversed in the halfway is accommodated in the space to be in a winding state. For example, according to Japanese Patent Laid-Open Publication No. 2010-3514, one end of this flat cable is fixed to the rotor side, and the other end is fixed to the stator side. The flat cable is reeled back from a cylindrical wall surface of the rotor corresponding to a rotating direction of the rotor to be wound around a cylindrical wall surface of the stator or reeled back from the cylindrical wall surface of the stator to be wound around the cylindrical wall surface of the rotor. This movement is repeated, so that an angular change between the rotor and the stator due to a relative rotation therebetween is absorbed by a change of the winding state of the flat cable. A spacer is arranged between the rotor and the stator for regulating a route of the flat cable.

However, the above conventional rotary connector device has a problem that sliding noises between the flat cable and the rotor or sliding noises between the case and the rotor are generated at the rotating of the steering shaft. For overcoming this problem, it is considered that an excellent material in sliding properties is used as a member of the rotor to reduce the sliding noise between the rotor and the flat cable at the rotating of the steering shaft. The excellent material in sliding properties, however, has a tendency of being insufficient in strength. As a result, as the excellent material in sliding properties is used in the rotor, it is difficult to ensure the strength of the rotary connector device.

SUMMARY OF THE INVENTION

Accordingly, the present invention is made in view of the above described problems, and the present invention has an object to provide a rotary connector device which ensures the strength, as well as reduces sliding noises at the rotating of a steering shaft.

For this purpose, according to an aspect of the present invention, a rotary connector device comprises a rotor, a stator forming an annular space with the rotor between the rotor and the stator, and a flat cable accommodated in the annular space, of which both sides are pulled out outside of the annular space via the rotor and the stator, wherein the rotor comprises:
a rotor main body made of a resin with high strength; and
a rotor cover portion made of a resin with high lubricating properties, wherein
the rotor main body comprises:
a disc portion; and
a cylindrical portion axially extending from the center of the disc portion, and
the rotor cover portion comprises:
a disc portion overlapping the disc portion of the rotor main body; and
a cylindrical portion overlapping the cylindrical portion of the rotor main body, the disc portion and the cylindrical portion respectively facing the annular space.

According to the aspect of the present invention, the rotor comprises the rotor cover portion and the rotor main body each made of a different material, and the excellent material in sliding properties is used in the rotor cover portion. Therefore the sliding properties at the rotating of the steering shaft can be enhanced to reduce the sliding noises.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DESCRIPTION OF THE EMBODIMENTS

Hereinafter, an embodiment in the present invention will be explained with reference to the accompanying drawings.

Figure 1:
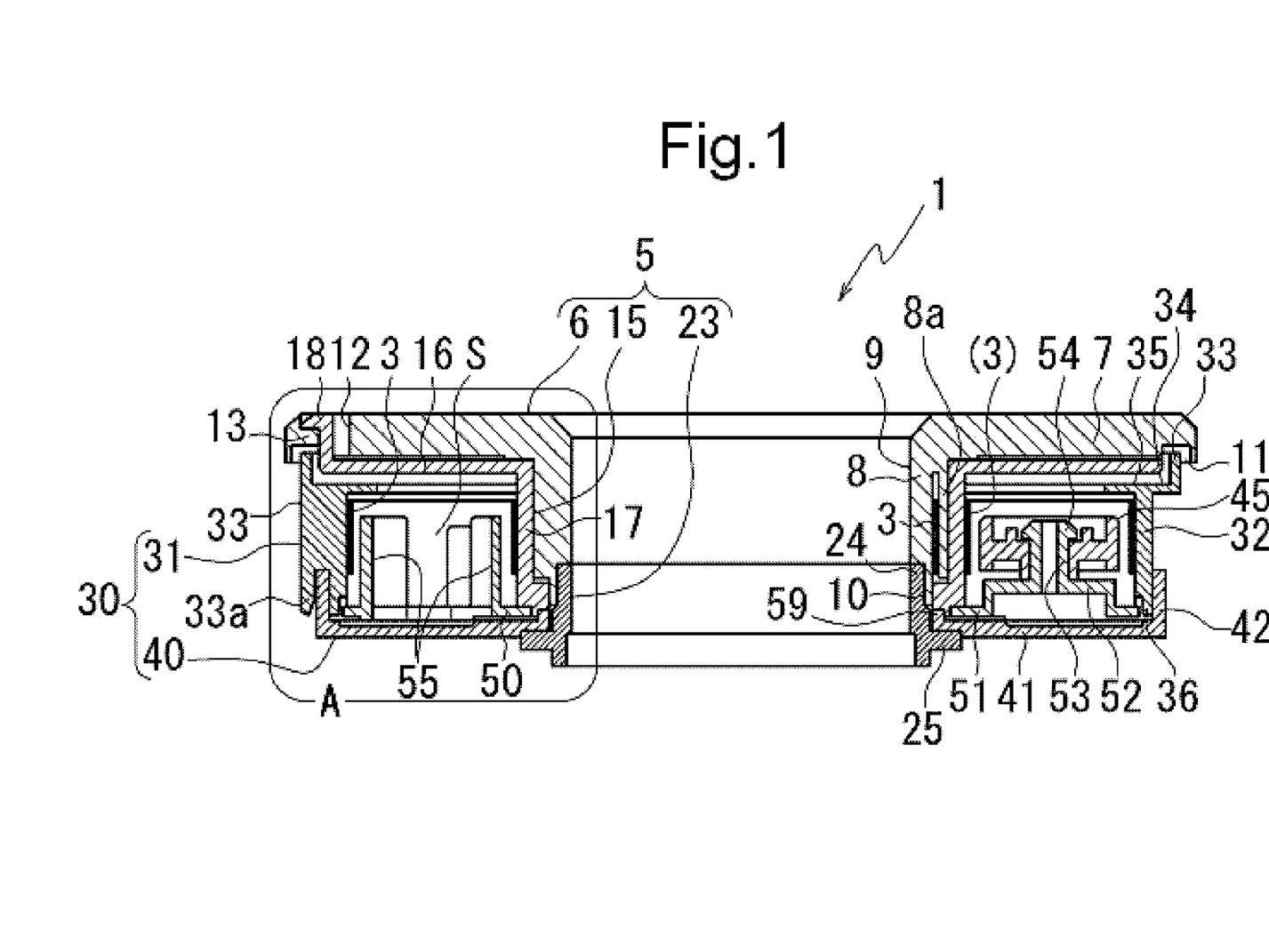
FIG. 1 is a general cross section showing a rotary connector device according to an embodiment in the present invention.

As shown in FIG. 1, a rotary connector device 1 is configured to include a rotor 5 connected to a rotating steering shaft, a stator 30 connected to a fixed side of a vehicular body, and a spacer 50 and a flat cable 3 arranged in an annular space S between the rotor 5 and the stator 30. The rotor 5 and the stator 30 are provided to be rotatable relative to each other as similar to the steering shaft and the vehicular body.

The rotor 5 comprises a rotor main body 6, a rotor cover portion 15 overlapping the rotor main body 6, and a rotor attachment 23. The rotor main body 6 is made of a resin material capable of ensuring strength thereof, for example, a PBT (polybutylene terephthalate) resin, and is configured to have a predetermined strength with a toughening agent or the like. The rotor main body 6 includes a disc-shaped disc portion 7, and a cylindrical portion 8 axially extending from the center of the disc portion 7. The cylindrical portion 8 is provided with a through hole 9 therein. A groove 11 is formed in a ring shape on the lower surface of the disc portion 7 at an inner diameter side just proximal to an outer peripheral potion thereof. A diameter enlarged portion 10 is formed from a lower end portion of the cylindrical portion 8 to a predetermined position.

Figure 2:
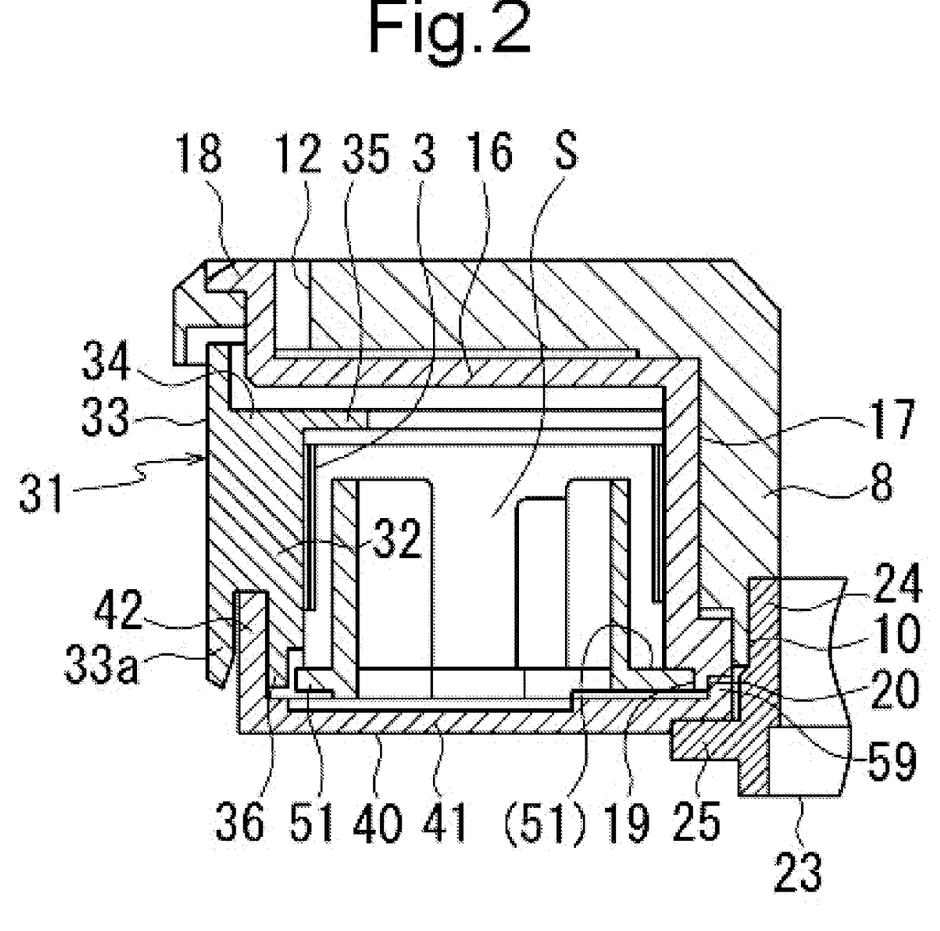
FIG. 2 is an enlarged cross section of A portion in FIG. 1.
Figure 5:
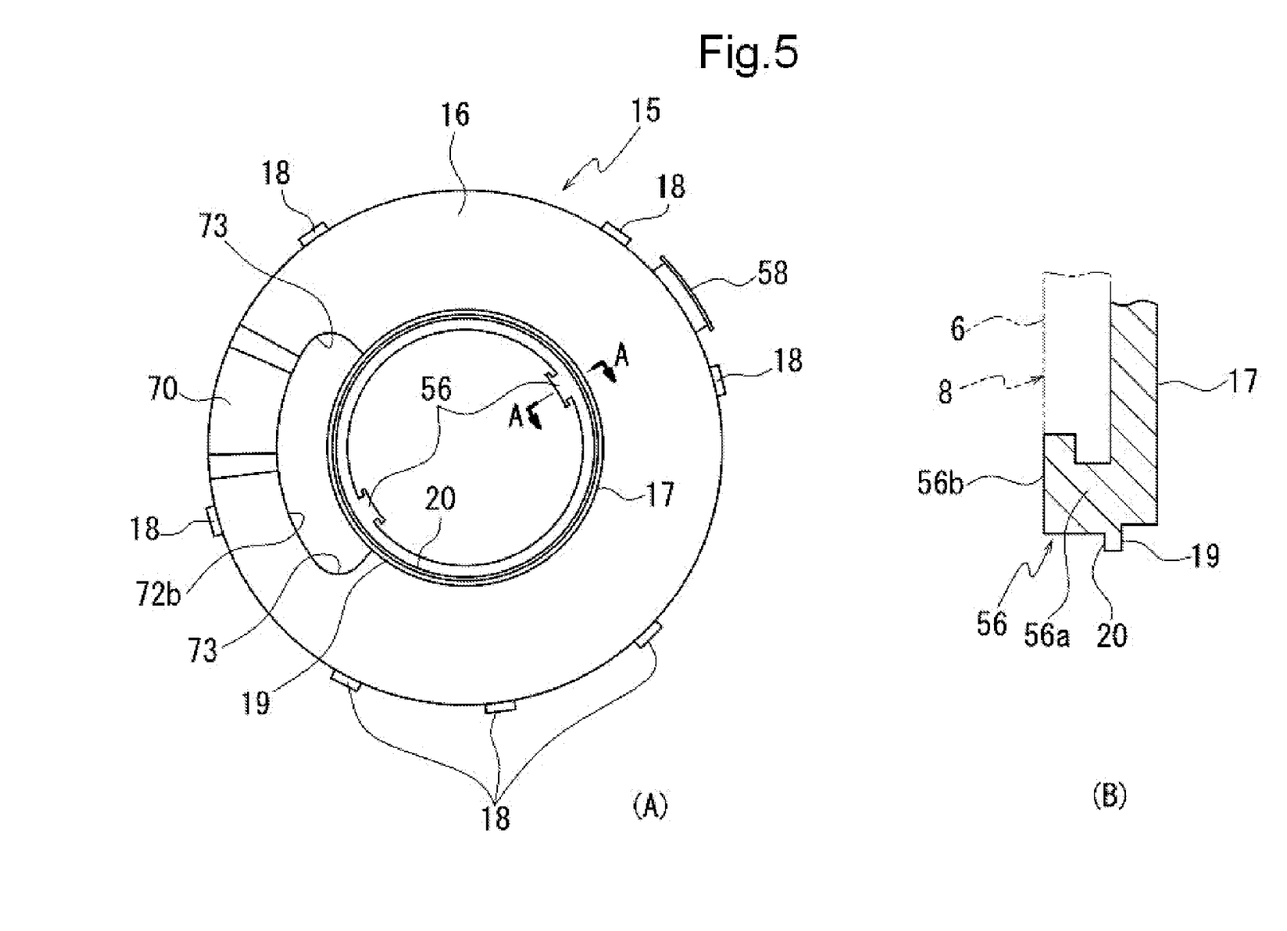
FIG. 5A and FIG. 5B are views each showing a rotor cover portion in the embodiment.

The rotor cover portion 15 is made of, for example, a high lubricating resin of a polyacetal group or the like, and comprises a disc portion 16 covering an inner diameter side of the disc portion 7 than the groove 11 of the disc portion 7, and a cylindrical portion 17 covering an outer peripheral surface of the cylindrical portion 8. The disc portion 16 has a lower surface defining an upper end of the annular space S and the cylindrical portion 17 has an outer peripheral surface defining an inner periphery of the annular space S. The rotor cover portion 15 is fixed to the rotor main body 6 by hook clicks 18 and hook clicks 56. The hook clicks 18 are provided at several locations in the disc portion 16 immediately inside of an outer peripheral edge thereof, and are engaged in engagement portions 13 of engagement holes 12 provided in the disc portion 7 near the outer periphery thereof. In addition, the hook clicks 56 are, as shown in FIG. 5A, provided in a lower end portion of the cylindrical portion 17 at the inner edge. The hook click 56, as shown in FIG. 5B, comprises a flange portion 56a extending toward an inner diameter side, and an engagement portion 56b extending upwards from a tip end of the flange portion 56a, and the engagement portion 56b enters into a side of the through hole 9 of the cylindrical portion 8 for the cylindrical portion 17 to be engaged to the cylindrical portion 8. In addition, as shown in FIG. 2, a lower end portion of the cylindrical portion 17 is provided with a diameter reduced portion 19 at the outer peripheral side and a diameter enlarged portion 20 at the inner peripheral side.

The rotor attachment 23 is formed in a short, cylindricalshape, and has a fitting portion 24 to be fitted in the diameter enlarged portion 10 of the cylindrical portion 8 in the rotor main body 6. As the fitting portion 24 is fitted in the diameter enlarged portion 10, an inner peripheral surface of the rotor attachment 23 is flush with an upper inner peripheral surface of the through hole 9 in the cylindrical portion 8. Further, the fitting portion 24 is provided with a flange portion 25 on the downward outer periphery. The flange portion 25 supports, as described later, a disk shaped bottom cover 40 of the stator 30 from downward.

The stator 30, as shown in FIG. 1, comprises a cylindrical case 31 an inner periphery of which defines an outer periphery of the annular space S, and the disc-shaped bottom cover 40 an upper surface of which defines a lower end of the annular space S. The case 31 is made of, for example, a high lubricating resin of a polyacetal group or the like, and is provided with a cylindrical inner wall 32 axially in parallel as a main part. A flange portion 34 is provided across an entire circumference in an upper end portion of the inner wall 32 at an outer diameter side thereof. An outer wall 33 rises in a ring shape across an entire circumference in an outer peripheral edge portion of the flange portion 34 to extend axially upwards. The outer wall 33 extends inside the groove 11 of the disc portion 7 in the rotor main body 6 in such a manner as not to make contact with the disc portion 7, and does not slide on the disc portion 7.

A retaining flange portion 35 extends in an inner diameter direction from an upper end of the inner wall 32 by a predetermined amount across an entire circumference. An upper surface of the retaining flange portion 35 is flush with an upper surface of the flange portion 34. This retaining flange portion 35 serves to prevent the flat cable 3 from pulling out from a constant position where the flat cable 3 is wound inside the annular space S. Further, as shown in FIG. 2, a diameter enlarged portion 36 is formed on an inner surface of the inner wall 32 at the lower end portion thereof across the entire periphery. The outer wall 33 extends further downwards from the flange portion 34 at several locations in the outer diameter side of the inner wall 32 to form outer walls 33a. A groove is formed at the inner peripheral side of the outer wall 33a between the outer wall 33a and the inner wall 32.

The bottom cover 40 mainly comprises a disc portion 41, and a fitting wall 42 rising to an axial predetermined position in an outer peripheral edge of the disc portion 41. A tip end of the fitting wall 42 is fitted in the groove formed between the inner wall 32 and the outer wall 33a in the case 31, and the bottom cover 40 is integral with the case 31. On the other hand, a projecting portion 59 projecting across an entire circumference on an inner peripheral edge of the disc portion 41 is fitted into the diameter enlarged portion 20 at the lower end of the cylindrical portion 17 in the rotor cover portion 15. The disc portion 41 is relatively rotatably sandwiched between the cylindrical portion 17 and the flange portion 25 of the rotor attachment 23.

Figure 4:
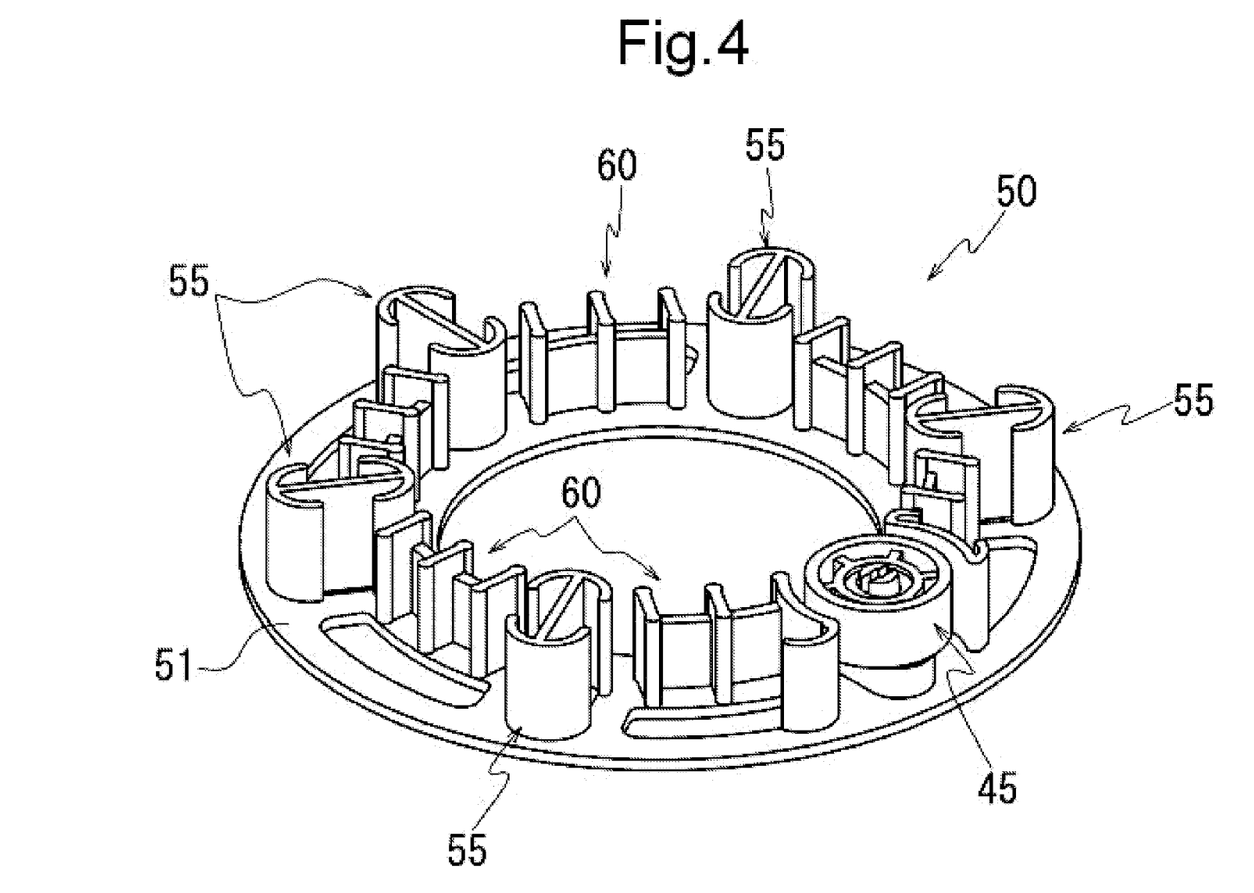
FIG. 4 is a perspective view showing a spacer in the embodiment.

The spacer 50 is made of a resin having high lubricating properties such as, for example, a polyacetal group, and, as shown in FIG. 4, supports a roller 45 on an annular plate portion 51, as well as is provided with guide portions 55 and guide portions 60 having a plurality of different configurations from each other. The annular plate portion 51 is, as shown in FIG. 1, positioned in a vertical direction by sandwiching the inner peripheral edge between the cylindrical portion 17 and the disc portion 41 of the bottom cover 40 in the diameter reduced portion 19 of the cylindrical portion 17 in the rotor cover portion 15, and by sandwiching the outer peripheral edge between the inner wall 32 and the disc portion 41 of the bottom cover 40 in the diameter enlarged portion 36 of the inner wall 32 in the case 31, and at the same time, is arranged to be rotatable relatively to the rotor 5 and the stator 30.

The flat cable 3 is arranged between the cylindrical portion 17 of the rotor cover portion 15 and the guide portion 55 of the spacer 50 in the annular space S, and is reversed by a roller 45 and is arranged between the inner wall 32 of the case 31 and the guide portion 55 of the spacer 50 to be in a winding state. In this arrangement, one end of the flat cable 3 in the winding state is pulled out outside of the annular space S from a side of the rotor 5, and the other end is pulled out outside of the annular space S from a side of the stator 30.

In the present embodiment, the flat cable 3 is pulled out from the side of the rotor 5 to the annular space, but the flat cable 3 is accommodated in the side of the rotor 5. For this reason, a flat cable groove 8a is formed across a circumferential predetermined range in a wall of the cylindrical portion 8 in the rotor main body 6. The flat cable groove 8a has a deeper section than a width of the flat cable 3 and is opened axially downwards, and both ends thereof in the circumferential direction have pulling-out openings of the flat cable 3 to an outer peripheral side. The unillustrated pulling-out opening of one end is a pulling-out opening to a side of the rotor main body 6 and the other end is a cable pulling-out opening 8b to a side of the annular space S shown in FIG. 3. The cable pulling opening 8b is opened to be inclined from a radial direction to a circumferential direction in a direction in which the flat cable 3 is pulled out into the annular space S to be wound.

The flat cable 3 is inserted from the downward side of the flat cable groove 8a, that is, from the open side to be retained therein. One end of the flat cable 3 in the side of the rotor 5 is pulled out from the pulling-out opening of the flat cable groove 8a at the side of the rotor main body 6 to be bent, and extends to a radial predetermined position along the lower surface of the disc portion 7. In addition, as shown in FIG. 3, for pulling out the flat cable 3 to the side of the annular space S from the flat cable groove 8a, an opening portion 72 is formed in the rotor cover portion 15.

Figure 6:
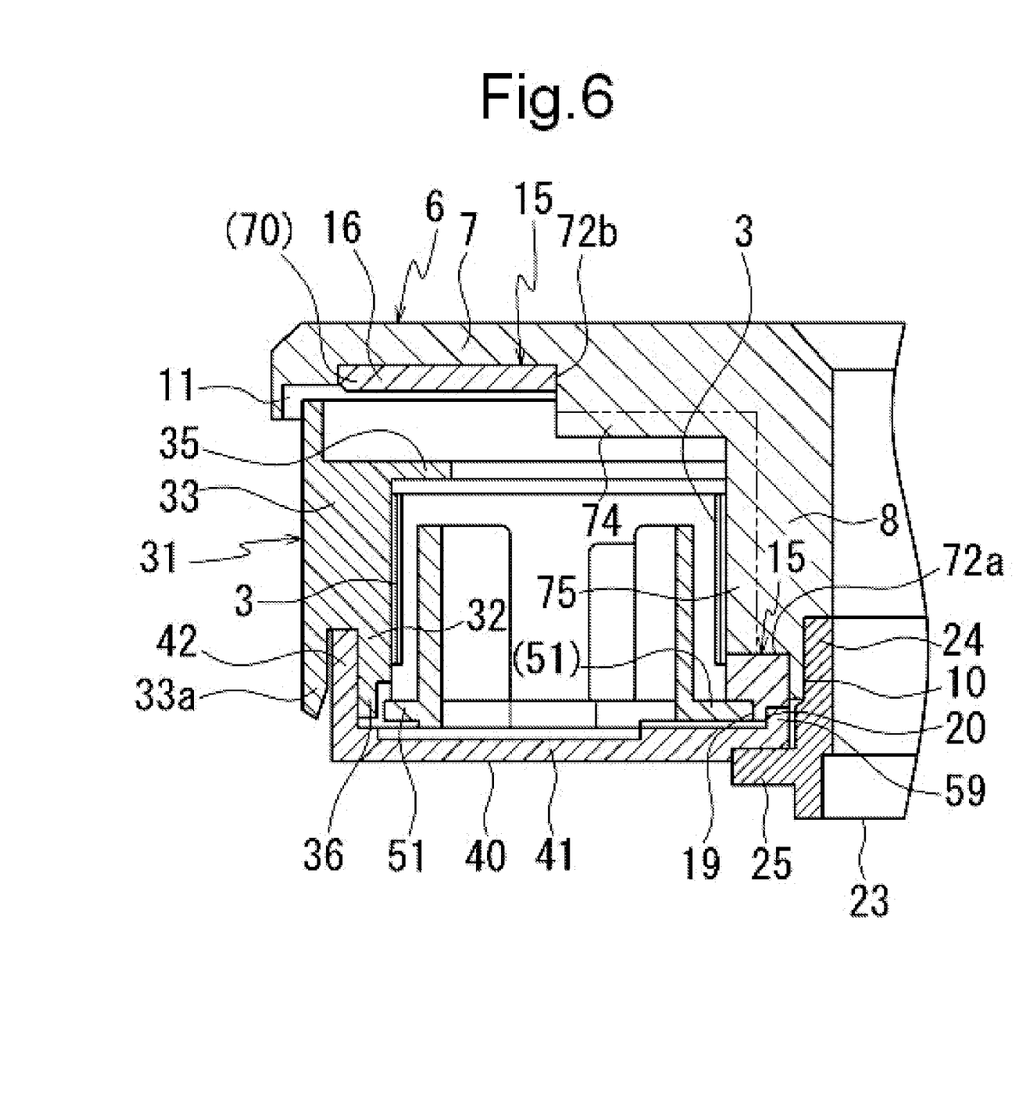
FIG. 6 is an enlarged cross section showing a section different from that in FIG. 2.

The opening portion 72 is, as shown in FIG. 6, connected to an opening portion 72a of the cylindrical portion 17 and an opening portion 72b of the disc portion 16. The opening portion 72a is configured by cutting off the cylindrical portion 17 from a position immediately above the diameter reduced portion 19 to the upper end of the cylindrical portion 17 by a circumferential opening angle of approximately 90 degrees connecting to the circumferential end portion of the opening portion 72b. The opening portion 72b is, as shown in FIG. 5A, configured by cutting off the disc portion 16 in an arc shape along an inner peripheral side of the disc plane. A radial direction of the opening portion 72b has a width of the order of one-half of the disc portion 16 in the inner side. Each of corner portions 73 at both ends of the opening portion 72b in the circumferential direction has a circular shape, which prevents the flat cable 3 from hooking into the opening portion 72b at assembling the rotor main body 6 and the rotor cover portion 15.

Figure 3:
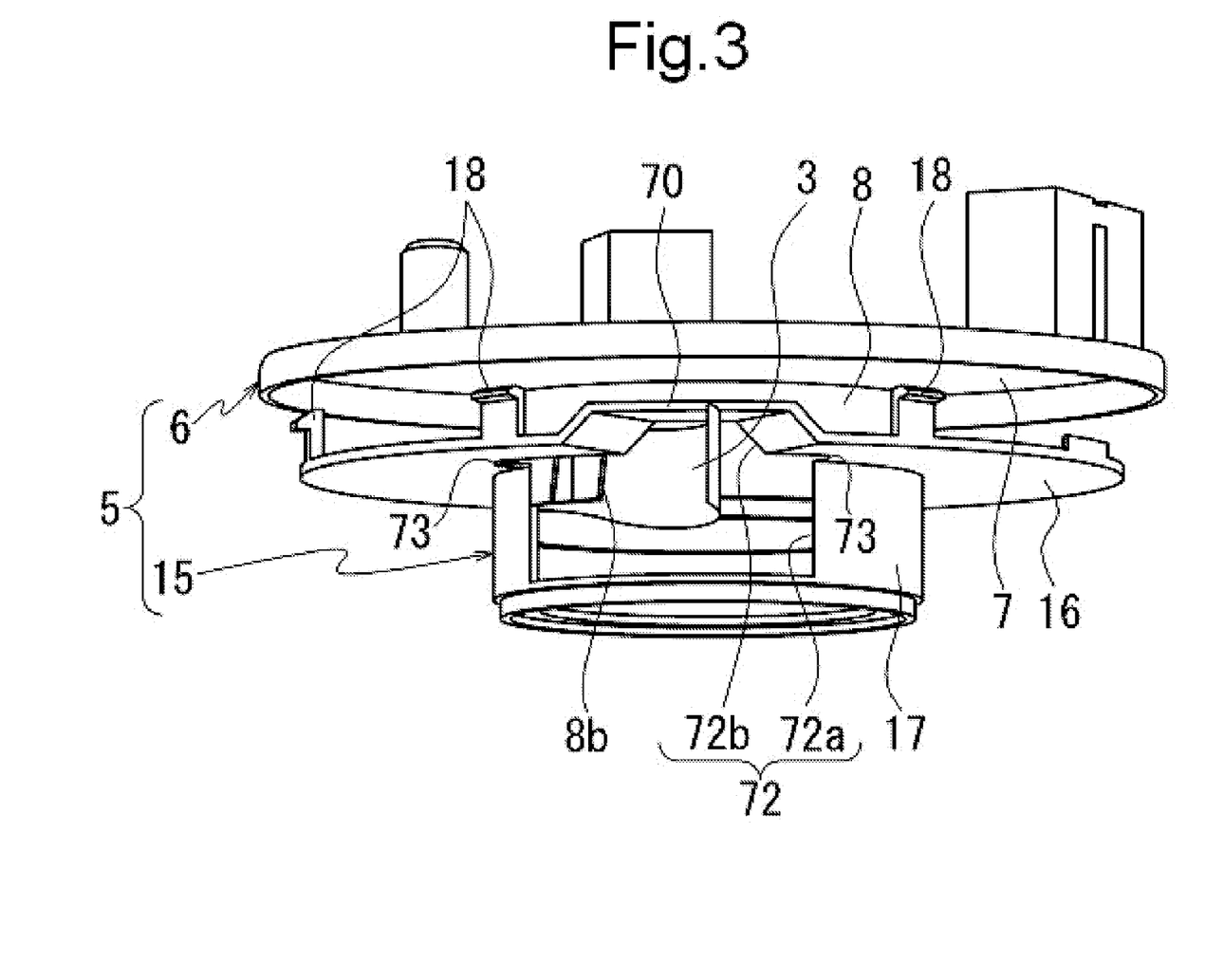
FIG. 3 is an exploded perspective view showing a rotor in the embodiment.

In the present embodiment, as shown in FIG. 3, at the time of assembling the rotor main body 6 and the rotor cover portion 15, it is required to pull the flat cable 3 out of the cable pulling-out opening 8b and to pass it through the opening portion 72 for leading it to the side of the annular space S in a state where the rotor main body 6 is axially separated from the rotor cover portion 15. Here, when the rotor main body 6 is axially separated from the rotor cover portion 15, a positional relation between the opening portion 72 and the cable pulling-out opening 8b is also axially shifted. At this time, in a case of passing the flat cable 3 through the opening portion 72, the flat cable 3 is axially pulled from the cable pulling-out opening 8b by the disc portion 16, so that the flat cable 3 tends to be shifted out of the flat cable groove 8a. In addition, as the flat cable 3 is largely shifted in the axial direction, the flat cable 3 is shifted out of the flat cable groove 8a in which it is accommodated, to drop from the rotor main body 6. For prevention of the dropping, a concave portion 70 is, as shown in FIG. 5A, provided in the disc portion 16 of the rotor cover portion 15.

The concave portion 70 is, as shown in FIG. 3, recessed from a side of the annular space S to a side of the disc portion 7. The concave portion 70 is, as shown in FIG. 5A, formed from a hole edge to an outer peripheral edge of the opening portion 72b in the disc portion 16, and across an angle of the order of 30 degrees as viewed from the center axis. In addition, the concave portion 70 is provided in a position shifted from the center of the arc of the opening portion 72b in a direction in which the flat cable 3 is pulled out in the annular space S. Further, a bottom surface of the concave portion 70 in a side of the annular space S forms, as shown in FIG. 3, a plane in parallel to the disc portion 16, and both side walls of the bottom surface form inclined surfaces opened toward the annular space S.

In addition, the assembling of the rotor main body 6 and the rotor cover portion 15 is performed with the flat cable 3 being placed on the bottom surface of the concave portion 70 in the side of the annular space S, which prevents the flat cable 3 from dropping from the rotor main body 6. That is, the concave portion 70 is recessed in an axial direction of the disc portion 7 and a position where the flat cable 3 makes contact with the rotor cover portion 15 is made closer to the disc portion 7 by the recessed amount at the time of assembling the rotor main body 6 and the rotor cover portion 15. Thereby an axial shift of the flat cable 3 is made small. In addition, as the axial shift of the flat cable 3 is made small at the assembling, the phenomenon that the flat cable 3 is out of the flat cable groove 8a and drops from the rotor main body 6 is prevented. Further, since the concave portion 70 is shifted in position in a direction where the flat cable 3 is pulled out of the center of the arc of the opening portion 72b, the flat cable 3 tends to be easily positioned on the bottom surface of the concave portion 70 at the assembling, thus easily bringing out the effect of the shift prevention by the concave portion 70. Further, since both the side walls of the concave portion 70 form the inclined surfaces, the flat cable 3 is easily led to the bottom surface of the concave portion 70 at the time of passing the flat cable 3 through the opening portion 72 for assembly.

A diameter enlarged portion 75 is provided in an outer peripheral portion of the cylindrical portion 8 corresponding to a position and a size of the opening portion 72a (refer to FIG. 6). The diameter enlarged portion 75 has an outer diameter larger by a thickness of the cylindrical portion 17 than the cylindrical portion 8, and is fitted in a portion formed by cutting off the cylindrical portion 17 by the opening portion 72a. As the diameter enlarged portion 75 is fitted therein, the diameter enlarged portion 75 is flush with an outer periphery of the cylindrical portion 17 to be integral therewith. In addition, the cable pulling-out opening 8b is formed on the diameter enlarged portion 75. In the opening portion 72b, a thickening portion 74 is provided in the disc portion 7. The thickening portion 74 is formed in an arc shape positioned and sized to correspond to the opening portion 72b, and is fitted in the opening portion 72b to be flush with the disc portion 16. Here, in the opening portion 72 in which the diameter enlarged portion 75 is fitted, the flat cable 3 makes direct contact with the rotor main body 6 not made of a high lubricating resin, but since the contact portion is near a position where the flat cable 3 is pulled out in the annular space S, a contact length between the flat cable 3 and the rotor main body 6 is small. Therefore there is no problem with generation of sliding noises.

Figure 7:
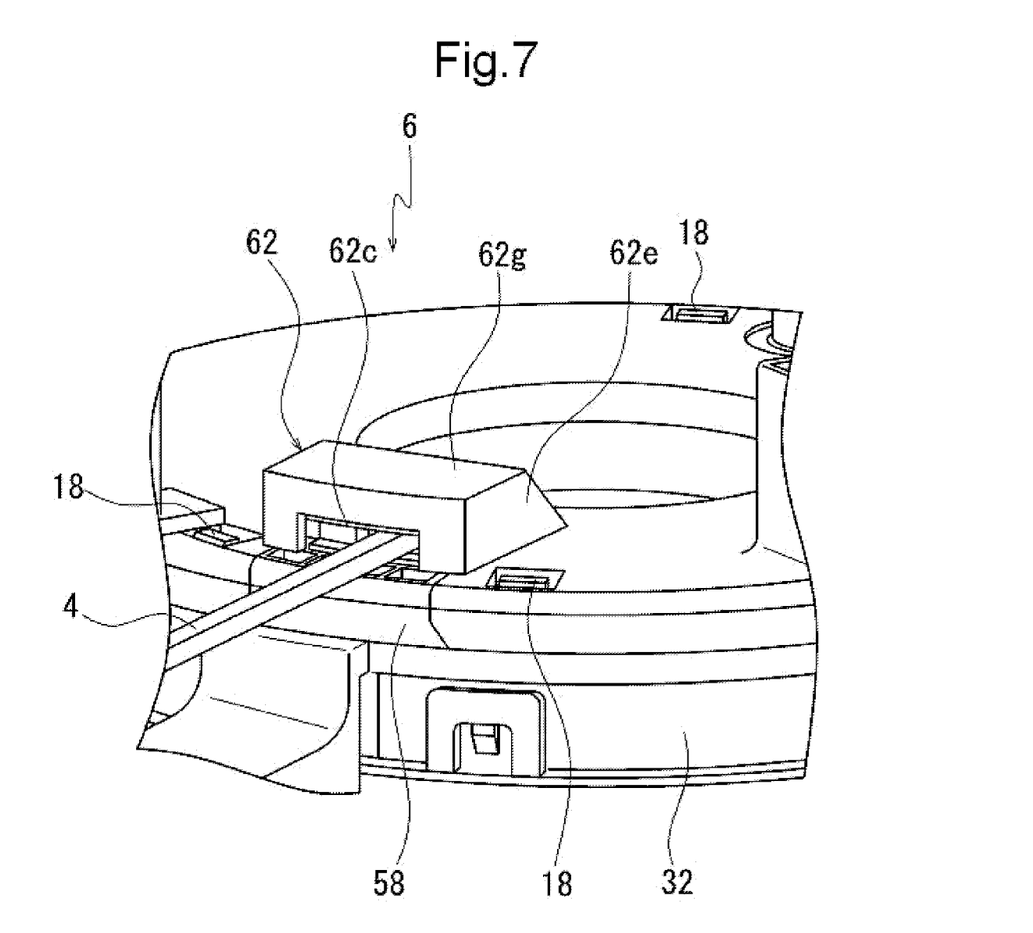
FIG. 7 is a perspective view showing a cord housing in the embodiment.
Figure 8:
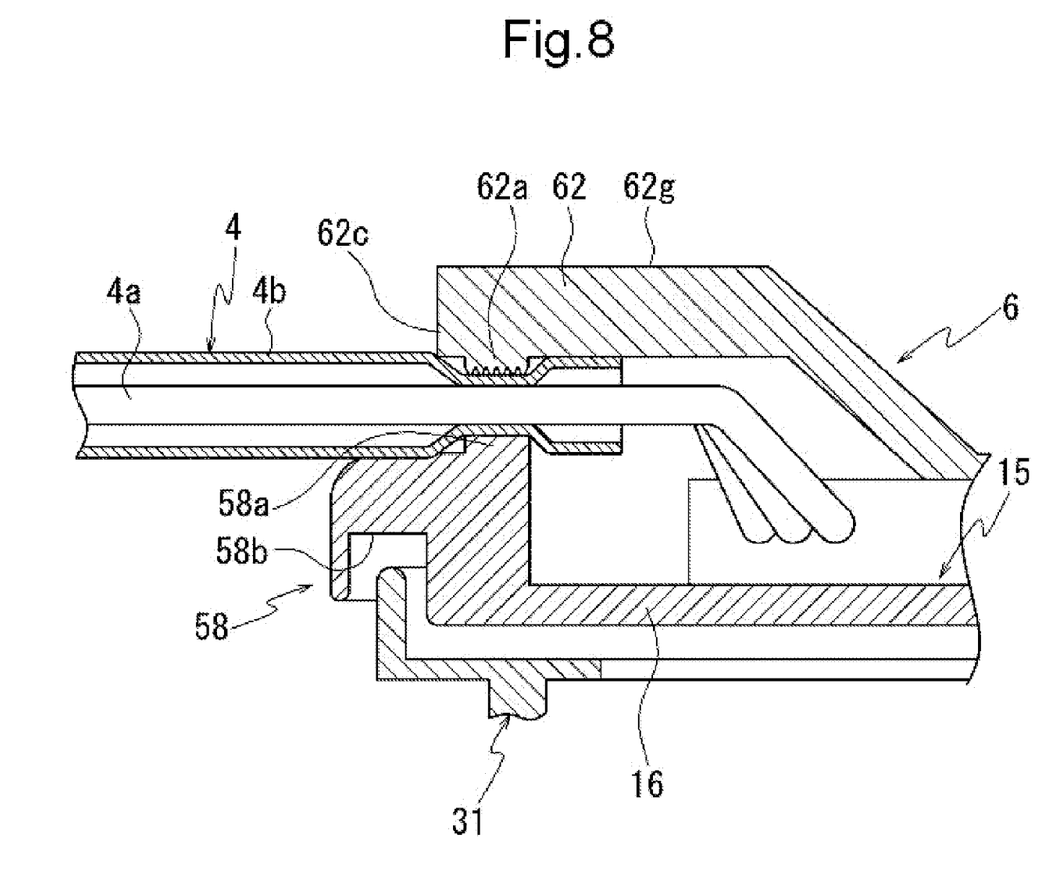
FIG. 8 is an enlarged cross section showing the cord housing in the embodiment.

In addition, in the present embodiment, the disc portion 7 of the rotor main body 6 is adapted to be capable of taking out the wiring from a predetermined position on the upper surface. In addition, as shown in FIG. 7, a cord housing 62 is provided as one of the taking-out openings. The cord housing 62 is provided to be swollen toward the upper side on the upper surface of the disc portion 7 in a position corresponding to a terminal of the flat cable 3 as shown in FIG. 7. In addition, the cord housing 62 is configured such that an opening portion 62c opened toward the outer periphery of the rotor main body 6 is surrounded by both side surfaces 62e rising axially at a right angle from the upper surface of the disc portion 7 and a ceiling surface 62g. As shown in FIG. 8, the backside of the cord housing 62 is opened, and forms a space for connecting the flat cable 3 and the cord 4. A fastening stopper 62a extends downwards from the ceiling surface 62g in the opening portion 62c of the cord housing 62. The fastening stopper 62a has a lower surface which is in parallel to the disc portion 16 and is provided with a sliding stop formed of fine, grooved, concave and convex portions cut at a right angle in a radial direction. In addition, the disc portion 7 has an outer peripheral portion including the groove 11, which is cut off by a constant width radially outwards from a position opposing the fastening stopper 62a.

The rotor cover portion 15 is, as shown in FIG. 8, provided with a fastening stopper 58a opposing the fastening portion 62a for retaining the cord 4, and an outer peripheral portion 58 corresponding to the cut-off portion of the disc portion 7 in the rotor main body 6. The outer peripheral portion 58 has the same configuration as the outer peripheral edge of the corresponding disc portion 7, and is provided with a groove 58b corresponding to the groove 11 of the rotor main body 6. When the rotor cover portion 15 is engaged to the rotor main body 6 for connection, as shown in FIG. 7 the outer peripheral portion 58 is fitted into the cut-off portion of the cord housing 62 in an outer peripheral lower part thereof without a gap to be integral therewith, thus forming a smooth outer periphery of the rotor 5. The groove 58b in the inner diameter side of the outer periphery also becomes flush with the groove 11 to form an integrated groove in a smooth ring shape.

The fastening stopper 58a rises up at a right angle from an outer peripheral edge of the rotor cover portion 15 toward the cord housing 62. An upper surface of the fastening stopper 58a is provided with a surface which is in parallel to the disc portion 16 and opposes a surface of a tip end portion of the fastening stopper 62a. A tip end portion of the fastening stopper 58a and the tip end portion of the fastening stopper 62a respectively have the same width in a radial direction. The cord 4 is, as shown in FIG. 8, configured to be provided with cord core wires 4a inside and a cord covering portion 4b for covering the surrounding area of the cord core wires 4a. The several cord core wires 4a inside the cord covering portion 4b are appropriately put together so as to form a single wire, which is covered with the cord covering portion 4b. The cord covering portion 4b is made of a flexible material, for example, polyethylene.

The cord 4 is sandwiched between the fastening stopper 58a and the fastening stopper 62a for the retaining by squeezing the cord covering portion 4b of the cord 4 therewith, and the cord 4 can be taken out of the rotor main body 6. For thus sandwiching the cord 4 between the fastening stopper 58a and the fastening stopper 62a to be retained therebetween, a distance between the opposing fastening stopper 58a and fastening stopper 62a is made smaller than a diameter of the cord 4, and longer than a diameter of the cord core wire 4a. The retaining of the cord 4 by the fastening stopper 58a and the fastening stopper 62a prevents the cord 4 from being pulled out of the rotor 5 or shifted therefrom. In addition, the sliding stop formed of the grooved concave and convex portions provided on the lower surface of the fastening stopper 62a enhances this effect. Further, the opening portion 62c is appropriately sectioned in the circumferential direction by providing projections in a circumferential direction of the cord 4, and configurations sectioned to correspond to the projections are provided also in the outer peripheral portion 58, thus making it possible to retain different kinds of cords 4 in a line at the same time.

The present embodiment is configured as described above. That is, the present embodiment is provided with the rotary connector device 1 in which the annular space S is formed between the rotor 5 and the stator 30, and the flat cable 3, both ends of which are pulled out through the rotor 5 and the stator 30 outside of the annular space S, is accommodated in the annular space S in a state where the winding direction thereof is reversed in the halfway. In the rotary connector device 1, the rotor 5 includes the rotor main body 6 made of PBT, and the rotor cover portion 15 made of a polyacetal resin, wherein the rotor main body 6 includes the disc portion 7 and the cylindrical portion 8 axially extending from the center of the disc portion 7, and the rotor cover portion 15 includes the disc portion 16 overlapping the disc portion 7 of the rotor main portion 6, and the cylindrical portion 17 overlapping the cylindrical portion 8 of the rotor main body 6, each facing the annular space S. Therefore the rotor main body 6 is made of the PBT resin, and the strength of the rotary connector device 1 can be ensured. In addition, since the rotor cover portion 15 is made of the polyacetal resin, the sliding properties of the contact surface between the rotor 5 and the flat cable 3 can be enhanced to reduce generation of the sliding noises between the rotor 5 and the flat cable 3. By thus forming the rotor main body 6 and the rotor cover portion 15 with the different materials, the strength of the rotary connector device 1 can be ensured and at the same time, the generation of the sliding noises thereof can be reduced. Further, since the rotor main body 6 is made of the PBT resin, heat resistance properties and weather resistance properties of the rotary connector device 1 can be ensured.

In addition to the above, in the present embodiment, the case 31 and the spacer 50 each are made of the polyacetal resin. Therefore the sliding resistance between the case 31 and the flat cable 3 in the annular space S can be reduced to reduce the generation of the sliding noises, and similarly by reducing the sliding resistance between the spacer 50 and the flat cable 3, the generation of the sliding noises therebeween can be reduced. In addition, not only the sliding resistance to the flat cable 3 but also the direct sliding resistance between the bottom cover 40 and the rotor 5 can be reduced to reduce the generation of the sliding noises therebeween.

In the present embodiment, the flat cable 3 is retained by the rotor main body 6 made of the PBT resin, and is pulled out into the annular space S from the opening portion 72 provided in the rotor cover portion 15. Therefore the terminal of the flat cable 3 can be stably retained by the material having the strength.

Further, in the present embodiment, the disc portion 16 of the rotor cover portion 15 is provided with the concave portion 70 recessed to aside of the disc portion 7 of the rotor main body 6 in a section of the disc portion 16 corresponding to the opening portion 72. according to this structure, when the assembling between the rotor main body 6 and the rotor cover portion 15 is performed with the flat cable 3 being placed on the bottom surface of the concave portion 70 in a side of the annular space S, the phenomenon that the flat cable 3 is out of the flat cable groove 8a to drop from the rotor main body 6 is prevented.

In addition, the concave portion 70 is provided to be shifted in position from the center of the arc of the opening portion 72b in a direction where the flat cable 3 is pulled out. Therefore the flat cable 3 tends to be easily positioned on the bottom surface of the concave portion 70 at the time of assembling to enhance the effect of the shift prevention by the concave portion 70. Further, the concave portion 70 is configured such that each of both side walls of the bottom surface is formed as an inclined surface opened toward the annular space S. Therefore at the time of passing the flat cable 3 through the opening portion 72 for assembly, the flat cable 3 tends to be easily led to the bottom surface in the side of the concave portion 70. As described above, the concave portion 70 can prevent the flat cable 3 from dropping from the rotor main body 6 at the time of assembling the rotor main body 6 and the rotor cover portion 15. As a result, work efficiency of an assembling work of the rotor main body 6 and the rotor cover portion 15 can be improved to reduce the manufacturing costs.

Further, in the present embodiment, the cord 4, which is connected to the flat cable 3 and is pulled out of the outer peripheral portion of the rotor 5, is sandwiched between the disc portion 16 of the rotor cover portion 15 and the disc portion 7 of the rotor main body 6 to be retained therebetween. Therefore the cord 4 can be sandwiched between the rotor main body 6 and the rotor cover portion 15 to be retained without using other new retaining members other than the rotor main body 6 and the rotor cover portion 15. Accordingly, the cord 4 can be pulled out of the rotor 5 without increasing the numbers of components in use to reduce costs and the assembling man-hours.

In the present embodiment, the polyacetal resin is shown as an example of the high lubricating resin material used in the rotor cover portion 15, the case 31, and the spacer 50, but the other material having the similar properties may be used as needed as an alternative for it. For example, a PTFE material may be used as the high lubricating resin material or a resin material appropriately containing a lubricating agent may be used. These alternatives may be used likewise instead of the PBT resin used in the rotor main body 6, and the other material having the appropriate strength, for example, a PEN resin may be used as an alternative.

Further, the present embodiment adopts the rotary connector device of reversing the winding direction of the flat cable 3 in the halfway, but the present invention may be applied to a rotary connector device of not reversing the winding direction of the flat cable 3 in the halfway, for example, of a spiral type.

In addition, the configuration, the position, and the area of the opening portion 72 are not limited to those in the present embodiment, and may differ as needed. For example, in the present embodiment, the angle of opening portion 72 is set to approximately 90 degrees, but may be 120 degrees or 60 degrees. Also in regard to the position of the opening portion 72, the opening portion 72a is formed from a position immediately above the diameter reduced portion 19, but as long as the flat cable 3 can pass through the opening portion 72, a position thereof may be not formed immediately above it. Further, in the present embodiment, the width of the opening portion 72b is set to the degree of one-half of the disc portion 16 at the inside, but is not limited thereto. Further, the configuration, the position, the area, and the axial depth of the concave portion 70 are not limited to those of the present embodiment, and as long as the concave portion 70 can have an axial allowance for placing the flat cable 3 on the bottom surface at the time of assembling, the concave portion 70 may be changed as needed to a size and a position required at the time of assembling.

While only the selected embodiment has been chosen to illustrate the present invention, it will be apparent to those skilled in the art from this disclosure that various changes and modifications can be made therein without departing from the scope of the invention as defined in the appended claims. Furthermore, the foregoing description of the embodiment according to the present invention is provided for illustration only, and not for the purpose of limiting the invention as defined by the appended claims and their equivalents.

What is claimed is:

1. A rotary connector device comprising:
   a rotor;
   a stator forming an annular space with the rotor between the rotor and the stator; and
   a flat cable accommodated in the annular space, of which both sides are pulled out outside of the annular space via the rotor and the stator, wherein
   the rotor comprises:
   a rotor main body made of a resin with high strength; and
   a rotor cover portion made of a resin with high lubricating properties, wherein
   the rotor main body comprises:
   a rotor main body disc portion; and
   a rotor main body cylindrical portion axially extending from the center of the rotor main body disc portion, and
   the rotor cover portion comprises:
   a rotor cover disc portion overlapping the rotor main body disc portion of the rotor main body; and
   a rotor cover cylindrical portion overlapping the rotor main body cylindrical portion of the rotor main body, the rotor cover disc portion and the rotor cover cylindrical portion of the rotor cover portion are respectively facing the annular space; and
   a rotor attachment fitted in the rotor main body and supporting a lower part of the stator.

2. A rotary connector device comprising:
   a rotor;
   a stator forming an annular space with the rotor between the rotor and the stator; and
   a flat cable accommodated in the annular space, of which both sides are pulled out outside of the annular space via the rotor and the stator, wherein
   the rotor comprises:
   a rotor main body made of a resin with high strength; and
   a rotor cover portion made of a resin with high lubricating properties, wherein
   the rotor main body comprises:
   a rotor main body disc portion; and
   a rotor main body cylindrical portion axially extending from the center of the rotor main body disc portion, and
   the rotor cover portion comprises:
   a rotor cover disc portion overlapping the rotor main body disc portion of the rotor main body; and
   a rotor cover cylindrical portion overlapping the rotor main body cylindrical portion of the rotor main body, the rotor cover disc portion and the rotor cover cylindrical portion respectively facing the annular space,
   wherein the flat cable is retained in the rotor main body, and is pulled out in the annular space from an opening portion formed in the rotor cover portion.

3. The rotary connector device according to claim 2, wherein
   a section of the rotor cover disc portion in the rotor cover portion corresponding to the opening portion is provided with a concave portion recessed in a disc portion side of the rotor main body.

4. The rotary connector device according to claim 3, wherein
   the concave portion is provided to be shifted in position in a direction where the flat cable is pulled out from the center of the arc of the opening portion.

5. The rotary connector device according to claim 3, wherein
   the concave portion is configured to form both side walls of the bottom as inclined surfaces opened toward the annular space.

6. The rotary connector device according to claim 2, further comprising:
   a cord which is connected to the flat cable and is pulled out of an outer peripheral portion of the rotor, wherein
   the cord is sandwiched between the rotor cover disc portion of the rotor cover portion and the rotor main body disc portion of the rotor main body to be retained therebetween.

* * * * *